(12) United States Patent
Gosselin et al.

(10) Patent No.: US 8,160,554 B2
(45) Date of Patent: *Apr. 17, 2012

(54) SYSTEM AND METHOD FOR ENHANCED DISPLAY OF IN-NETWORK CALLER INFORMATION ON A MOBILE DEVICE

(75) Inventors: Mark Gosselin, Seattle, WA (US); Rick Hennessey, Bainbridge Island, WA (US)

(73) Assignee: Cequint, Inc., Seattle, WA (US)

( * ) Notice: Subject to any disclaimer, the term of this patent is extended or adjusted under 35 U.S.C. 154(b) by 396 days.

This patent is subject to a terminal disclaimer.

(21) Appl. No.: 12/422,919

(22) Filed: Apr. 13, 2009

(65) Prior Publication Data

US 2010/0261459 A1    Oct. 14, 2010

(51) Int. Cl.
*H04M 3/42* (2006.01)
*H04W 4/00* (2009.01)

(52) U.S. Cl. .................. 455/414.1; 455/466

(58) Field of Classification Search .................. 370/335, 370/342; 455/414.1, 414.2, 458, 550.31, 455/466, 412.2, 415, 418, 432.1, 433
See application file for complete search history.

(56) References Cited

U.S. PATENT DOCUMENTS

| | | | |
|---|---|---|---|
| 4,894,861 A | 1/1990 | Fujioka | |
| 4,924,496 A | 5/1990 | Figa et al. | |
| 5,210,789 A | 5/1993 | Jeffus et al. | |
| 5,220,599 A | 6/1993 | Sasano et al. | |
| 5,265,145 A | 11/1993 | Lim | |
| 5,446,785 A | 8/1995 | Hirai | |
| 5,490,205 A | 2/1996 | Kondo et al. | |
| 5,506,894 A | 4/1996 | Billings et al. | |
| 5,506,895 A | 4/1996 | Hirai et al. | |
| 5,546,447 A | 8/1996 | Skarbo et al. | |
| 5,727,057 A | 3/1998 | Emery et al. | |
| 5,734,706 A | 3/1998 | Windsor et al. | |
| 5,754,636 A | 5/1998 | Bayless et al. | |
| 5,771,283 A | 6/1998 | Chang et al. | |
| 5,805,677 A | 9/1998 | Ferry et al. | |
| 5,867,562 A | 2/1999 | Scherer | |
| 5,930,701 A | 7/1999 | Skog | |
| 5,982,867 A | 11/1999 | Urban et al. | |
| 6,046,687 A | 4/2000 | Janky | |
| 6,075,850 A | 6/2000 | Ali et al. | |
| 6,108,408 A | 8/2000 | Plunkett et al. | |
| 6,353,664 B1 | 3/2002 | Cannon et al. | |

(Continued)

FOREIGN PATENT DOCUMENTS

EP    0876038    11/1998

(Continued)

OTHER PUBLICATIONS

"CNAM Definition from PC Magazine Encyclopedia," PC Magazine Encyclopedia, 1981-2011, pp. 1-2, The Computer Language Company Inc., http://www.pcmag.com/encyclopedia_term.

(Continued)

*Primary Examiner* — Melody Mehrpour
(74) *Attorney, Agent, or Firm* — Lowe Graham Jones PLLC

(57) ABSTRACT

System and method for determining reporting to a subscriber whether an incoming call originates from inside or outside of a mobile carrier's network. An example system performs a GTT (global title translation) on an incoming number to determine the hosting carrier of any mobile phone number. When the result matches the subscriber's carrier, the mobile device then indicates to the subscriber (i.e. mobile device) that the call is an "in network call."

20 Claims, 2 Drawing Sheets

U.S. PATENT DOCUMENTS

| | | | |
|---|---|---|---|
| 6,366,670 | B1 | 4/2002 | Davis et al. |
| 6,449,351 | B1 | 9/2002 | Moss et al. |
| 6,643,516 | B1 | 11/2003 | Stewart |
| 6,714,639 | B1 | 3/2004 | Bedingfield et al. |
| 6,799,033 | B2 | 9/2004 | Kanefsky |
| 6,813,344 | B1 | 11/2004 | Lemke |
| 6,975,712 | B1 | 12/2005 | Schnarel et al. |
| 6,985,572 | B2 | 1/2006 | Gosselin |
| 7,016,482 | B2 | 3/2006 | Moss et al. |
| 7,085,257 | B1 | 8/2006 | Karves et al. |
| 7,155,211 | B2 | 12/2006 | Mun et al. |
| 7,170,984 | B2 | 1/2007 | Gosselin |
| 7,170,985 | B2 | 1/2007 | Gosselin |
| 7,200,212 | B2 | 4/2007 | Gosselin |
| 7,215,750 | B2 | 5/2007 | Nguyen et al. |
| 7,388,949 | B2 | 6/2008 | Contractor et al. |
| 7,623,849 | B2 | 11/2009 | Zellner |
| 7,756,259 | B2 | 7/2010 | Martin |
| 7,966,026 | B2 * | 6/2011 | Zellner et al. ......... 455/457 |
| 2001/0001012 | A1 | 5/2001 | Culli et al. |
| 2002/0128012 | A1 | 9/2002 | Kim et al. |
| 2002/0159574 | A1 | 10/2002 | Stogel |
| 2003/0041030 | A1 | 2/2003 | Mansfield |
| 2003/0063730 | A1 | 4/2003 | Woodring |
| 2003/0092432 | A1 | 5/2003 | Hwang |
| 2004/0066920 | A1 | 4/2004 | Vandermeijden |
| 2005/0215250 | A1 * | 9/2005 | Chava et al. ......... 455/433 |
| 2006/0089165 | A1 | 4/2006 | Smith et al. |
| 2006/0112167 | A1 | 5/2006 | Steele et al. |
| 2006/0234703 | A1 * | 10/2006 | Wuthnow et al. ....... 455/433 |
| 2007/0127656 | A1 | 6/2007 | Citron et al. |
| 2007/0230680 | A1 * | 10/2007 | McCann ........... 379/221.13 |
| 2008/0059642 | A1 | 3/2008 | Bhogal et al. |
| 2008/0240383 | A1 | 10/2008 | Fronczak et al. |
| 2008/0242293 | A1 | 10/2008 | Goddelin |
| 2008/0305792 | A1 * | 12/2008 | Khetawat et al. ....... 455/435.1 |
| 2009/0061860 | A1 * | 3/2009 | Jiang ............... 455/433 |
| 2009/0257575 | A1 | 10/2009 | Gosselin et al. |
| 2009/0323636 | A1 * | 12/2009 | Dillon et al. ......... 370/331 |
| 2010/0075644 | A1 | 3/2010 | Gosselin et al. |
| 2010/0222028 | A1 | 9/2010 | Gisby et al. |
| 2010/0261461 | A1 | 10/2010 | Gosselin et al. |
| 2010/0261462 | A1 | 10/2010 | Gosselin et al. |
| 2011/0045825 | A1 * | 2/2011 | Schwalb ........... 455/426.1 |

FOREIGN PATENT DOCUMENTS

| | | |
|---|---|---|
| EP | 0920169 | 6/1999 |
| EP | 1124387 | 8/2001 |
| EP | 1199899 | 4/2004 |
| EP | 1551201 | 7/2005 |
| GB | 2405768 | 1/2008 |
| JP | 4086144 | 3/1992 |
| JP | 4248739 | 9/1992 |
| JP | 09064960 | 3/1997 |
| JP | 9321856 | 12/1997 |
| JP | 10276257 | 10/1998 |
| JP | 2002044221 | 2/2002 |
| JP | 2002305602 | 10/2002 |
| JP | 2005198218 | 7/2005 |
| KR | 1020010027839 | 6/2001 |
| KR | 1020050071947 | 8/2005 |
| KR | 1020090043274 | 6/2009 |
| WO | 9717793 | 5/1997 |
| WO | 0229665 | 4/2002 |
| WO | 2004023767 | 3/2004 |
| WO | 2006024952 | 3/2006 |
| WO | 2007056577 | 5/2007 |
| WO | 2007095963 | 8/2007 |
| WO | 2008122052 | 10/2008 |
| WO | 2010120607 | 10/2010 |
| WO | 2010120610 | 10/2010 |

OTHER PUBLICATIONS

"Want to know Who's Calling? Hear the name and number announced before you answer!" ClassCo-The VoiceAnnounce Technology Company, 1 page, printed Mar. 25, 2011, http://www.voiceannounce.com.

"Calling Name Delivery (CNAM)," Cisco PGW 2200 Softswitch, Cisco Systems, 2007, pp. 1-13, http://www.cisco.com.

TIA TIA-764 TIA/EIA-41-D Enhancements for Wireless Calling Name Feature Descriptions, Telecommunications Industry Association; Jan. 1, 2002; IHS, Inc.; http://electronics.ihs.com/document/abstract; 1 page.

"Recommended GPS Navigator" Consumer Reports News, GPS and GPS Ratings from Consumer Reports, ConsumerReports.org, 2005-2011, pp. 1-2, http://news.consumerreports.org.

"GPS Location, Can Someone Track me on my Phone?" SprintUsers.com, Sep. 27, 2004, pp. 1-5, vBulletin, v.3.8.4, 2002-2007, Jelsoft Enterprises Ltd.

Nathalie Fiset, "Cellular GPS Phone Tracking," Ezine @rticles, Jan. 28, 2007, pp. 1-4, http://ezinearticles.com/?Cellular-GPS-Phone-Tracking&id=434437.

Matoba, N. and Yoshida, S. (1996), "Still image transmission using unequal error protection coding in mobile radio channel. Electronics and Communications in Japan (Part 1: Communications)," Mar. 23, 2007, 79: 75-85. http://onlinelibrary.wiley.com/doi/10.1002/ecja.4410790408/abstract.

"Show Your Facebook or MySpace Pic as Picture Caller ID!" PicDial Make Your Address Book Socially Aware!, Mar. 25, 2011, IQzone, Inc.; http://www.picdial.com.

"Frequently Asked Questions About Mobile to Mobile Calling," Residential Support Wireless Phone, 2011, Verizon, http://wireless-support.verizon.com/faqs/Calling+Plans/faq_in_calling.html.

"Sprint Cell Phone Reverse Lookup Downloads," FileHeap! Where People Get Files, pp. 1-4, 2000-2010, http://www.fileheap.com/dbquery/1/sprint+cell+phone+reverse+lookup+downloads.

Berg, Andrew; "Tap Me Offers In-Game Ad Platform," Wireless Week, pp. 1-2, Feb. 28, 2011, http://www.wirelessweek.com/News/2011/02/Business-TapMe-In-Game-Ad-Platform-Mobile-Content/.

VeriSign Authentication Services—The Leading Provider of SSL. printed Mar. 25, 2011, Symantec Corporation, http://www.verisign.com; cc 2011.

Wireless, Wherify.com, www.wherify.com/html/faq.asp?pageID=13; 1 page, printed Mar. 29, 2011; cc 2011.

* cited by examiner

SYSTEM AND METHOD FOR ENHANCED DISPLAY OF IN-NETWORK CALLER INFORMATION ON A MOBILE DEVICE

BACKGROUND OF THE INVENTION

Some mobile phone calling plans include reduced charges (i.e., free or minimal charge of monthly account time or allocated "minutes") when an incoming call comes from a caller that belongs to the same mobile network as the call recipient. Such promotional features make calls between subscriber mobile phones free of charge, for registered mobile handsets. Other plans permit subscribers to share minutes with other subscribers, when the mobile subscriber plans are obtained or linked together for billing purposes. The importance of identifying in-network calls is thus highlighted, as subscribers may avoid charges altogether if they can distinguish in-network calls from out-of-network calls, and the carrier can inform non-network callers of its free in-network calling feature, if such a feature were available.

Another approach to mobile telephony price promotion is the in-circle plan, such as a calling circle plan. Such plans allow subscribers to specify certain numbers that are called frequently from the subscriber's handset (the numbers comprise the subscriber's "circle"), and provides a discount on calls made "in-circle." Identifying the appropriate billing rate involves the carrier storing those numbers for each subscriber and checking a database at the time of call to apply promotional rates. An "in-circle" calling plan is not a general check of in-network calls, however, it is just a preferential billing promotion applied to a handful of frequently called numbers.

Other plans also allow subscribers to identify and preset caller "favorites," such as a set of frequently called numbers, which can include both in- and out-of network numbers, on a carrier's promotional billing plans. This type of reduced-cost calling is not an in-network notification, as it may include numbers outside of the carrier's network. Other proposals for discounted billing to frequently called numbers might Other proposals for discounted billing to frequently called numbers might apply lower billing rates for the most frequently called numbers each billing cycle, for all numbers called over a certain pre-set number of minutes each billing cycle, and so forth.

A few methods have previously been proposed for alerting the call recipient if the call source shares the same network. For example, a network-based Global Title Translation (GTT) query will identify the carrier associated with the Caller Identification (CDN) or Mobile Directory Number (MDN) to the Network Control Point (NCP) of the caller's mobile carrier. A GTT search is typically requested at a Signaling Transfer Point (STP) associated with the NCP, while the incoming call page is held pending the result of the query. Once the result is given, the call page with the information is released to the sender. While this permits the connection of the call and appropriate billing for an in-network call by the carrier, there is a cost associated with the GTT search by the carrier, and there is no display indicator of the in-network call to the call recipient indicating whether or not the call is in-network.

Another approach is set forth in US Patent Application Publication No. 2008/0059642 (IBM). This approach also requires a network-based determination of the carrier of the calling and the called party by the network carrier, and provision of the in-network notification to both the calling and the called parties. Three methods are recited, one, similar to GTT, requires a network database query by the caller's carrier, prior to call termination. This has the accuracy limitation, since mobile numbers are portable, and when callers switch networks this method introduces errors. The second method, performed after call termination, looks at the switching information for the caller and the called number, which is highly accurate. With this method, however, the data that the call is in-network is only determined after the call has been established and further requires that the in-network determination be incorporated into the established call via either a side channel or mixed into the digital signal itself. The third method, performed while the called party's phone is on, but not on a call, requires the phone to have a side data channel. This requires the phone, at startup, to contact the network to do a database lookup to see if the phone numbers in the address book are in-network. This method is limited to updating the 'in-network' status only of the phone numbers stored in the caller directory on the called party's handset, however. As a result, this method does not ensure that new callers and their numbers are identified as "in-network," which is the situation in which caller identification is the most helpful to the called party.

Considering the shortcomings of the aforementioned methods, it is clear that there is a need for a method for allowing mobile device users to determine whether their calls are "in-network" and thus potentially subject to certain cost-saving promotions or rate reductions offered by service providers, or to the display of enhanced information regarding the calling party. Therefore, an improved system and method for automatically notifying subscribers of the "in-network" status of calls is highly desirable.

SUMMARY OF THE INVENTION

This invention is directed to a system and method for determining whether an incoming call originates from inside or outside of a mobile carrier's network and indicates the result to the subscriber on a mobile handset.

The present invention provides a system and method that performs a Global Title Translation (GTT) on an incoming number to determine the hosting carrier of any mobile phone number. When the result matches the receiving subscriber's carrier, the mobile device then indicates to the subscriber (i.e. mobile device) that the call is an "in-network" call. The provision of the in-network message may be interchangeably referred to as a notification or notice, indication or indicator, event, flag, message, and the like, without varying the intent and breadth of this invention.

The indication may be selected from one or more from the set of visual (e.g., logo, text, picture, color or color change), audible (e.g., signal/tone, spoken notification), or haptic (e.g., vibration, pulse) notifications. The words "in network," "network," the name of the carrier, such as "Sprint," a logo of the carrier, or an image indicating the source of the call may be displayed to the call recipient. A specific ring tone, audio signal, audio message, or recorded message may be audibly outputted to the subscriber. A vibration or pulse pattern, repeated or separated by ring tone, generated from the phone's vibration mechanism, may be haptically outputted to the subscriber. As well, the subscriber's handset may provide notifications in combination with laptops, earpieces, or other devices commonly integrated with mobile devices, through USB or other supported wired connections, or via Bluetooth, 802.11 wireless, or other supported wireless communications links.

The in-network notification permits the subscriber to identify calls "in network," which are often of less cost, or free of charge, to answer. Also, the subscriber can identify friends and associates who are "out of network," and arrange the time and means of communication with them to save cost.

With the use of such an "in-network" indicator, the subscriber and/or the subscriber's carrier may also promote the migration of "out of network" callers to the subscriber's carrier.

These and other examples of the invention will be described in further detail below.

BRIEF DESCRIPTION OF THE DRAWINGS

Preferred and alternative examples of the present invention are described in detail below with reference to the following drawings.

DETAILED DESCRIPTION OF THE PREFERRED EMBODIMENT

Figure 1:
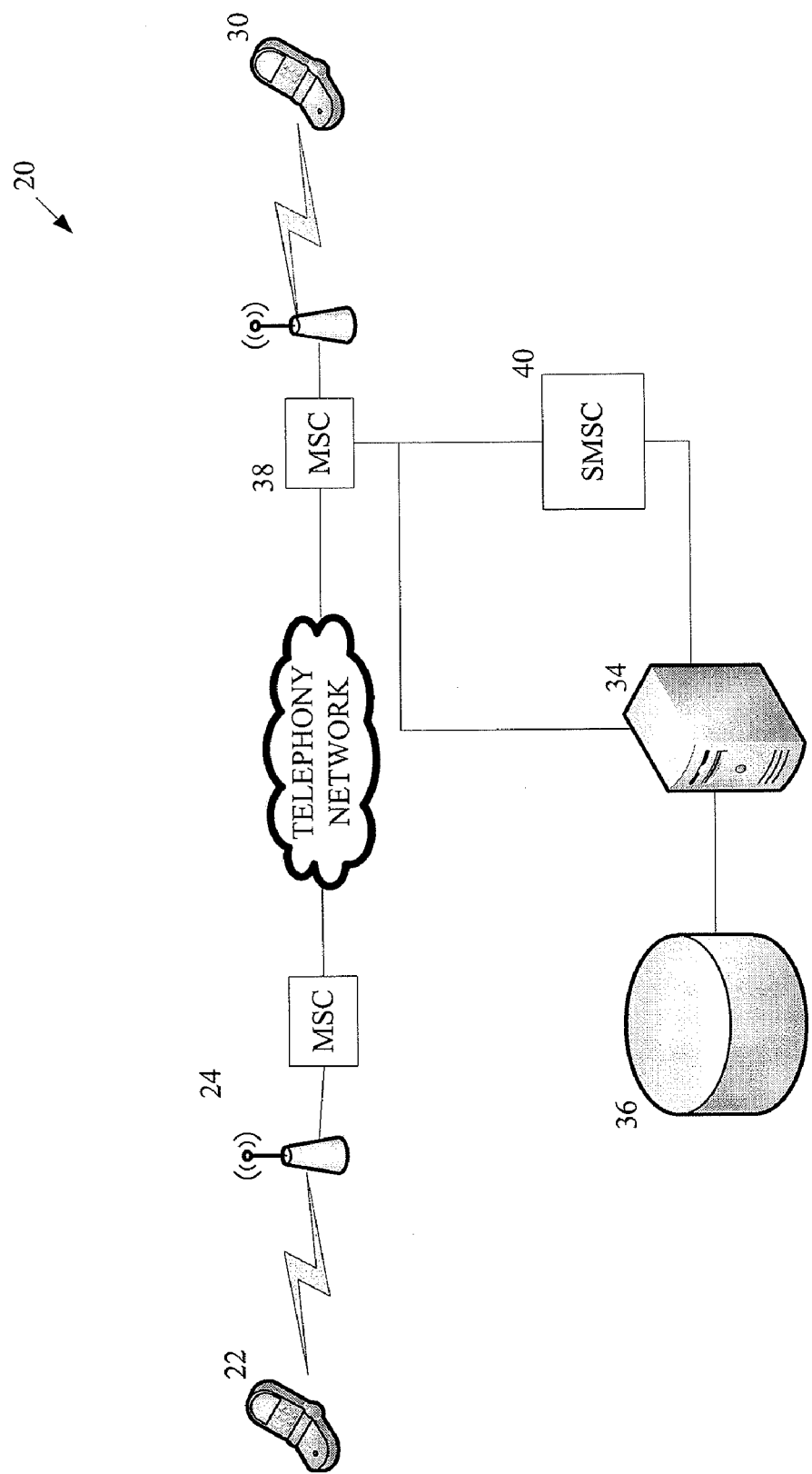
FIG. 1 is a diagram of an example system formed in accordance with an embodiment of the present invention.

FIG. 1 shows a system 20 that performs a GTT (global title translation) on an incoming number to determine the hosting carrier of any mobile phone number. If the result matches the subscriber's carrier, a terminating mobile device (TM) 30 indicates to the subscriber that the call is an "in network call." The indication may be selected from one or more from the set of visual (e.g., logo, text, picture), audible (signal/tone, spoken notification) or haptic notifications. The words "in network," "network," the name of the carrier, such as "Sprint," a logo of the carrier, or an image indicating the source of the call are displayed to the call recipient. A specific ring tone, audio signal, audio message, or recorded message is audibly outputted to the subscriber.

The in-network notification permits the subscriber to identify calls "in network," which are often of less cost, or free of charge, to answer. Also, the subscriber can identify friends and associates who are "out of network," and arrange the time and means of communication with them to save cost. This may be arranged automatically sending an SMS message to the caller, rather than picking up the call, if that is a less expensive or more convenient means. This may also be done silently.

The invention also permits the subscriber and/or the subscriber's carrier to promote the migration of "out of network" callers to the subscriber's carrier.

In one embodiment, after the call page generated by an originating mobile device (OM) 22 via an originating carrier system 24 is received on the TM 30, the TM 30 contacts a server 34 associated with a Mobile Switching Center (MSC) 38 associated with the TM 30. The server 34 performs a GTT and returns the result of the GTT back to the TM 30 for indication. If OM 22 is "in-network" with TM 30, then an "in-network" indicator is given. If OM 22 is not "in-network" with TM 30, then an "out of network" indication is given, and optionally a courtesy message is sent to the caller on the OM 22, such as a message indicating and/or scheduling the optimal time for a return call. The result is also stored on the TM 30 for future use with repeat incoming calls and can be refreshed by a variety of methods (i.e. time, usage frequency, open connection). The indications may be sent with the incoming call page, or made before releasing the call page at the MSC 38 to connect the call. If sent before releasing the call page at the MSC 38, the indication may be sent via SMS or other data channel delivery to the TM 30 and the OM 22, separate from and in advance of, the terminated call. Similar subject matter is discussed in co-pending application Ser. No. 12/349,679 filed Jan. 7, 2009, which is hereby incorporated by reference.

Depending on the carrier's network technology, if it is not possible to open a data channel to the server 34 to perform the GTT after a voice call page has been made to the TM 30, the GTT is performed at the network level prior to the call page being sent to the TM 30. Then, the result of the GTT may be sent to the TM 30 prior to the call page, using port-directed (as with Java applications) or application-directed (as with BREW application IDs) short message service (SMS) via a Short Message Service Center (SMSC) 40, or is included with other data (such as CNAM name identification data) in the call page. After the TM 30 receives the SMS, the GTT results are outputted to the subscriber of the TM 30.

In another embodiment, when none of the above facilities are available, a table lookup may be performed locally on the TM 30. A caller's number is examined by client software such as City ID® from Cequint, Inc. on the TM 30. A database stored on the TM 30 contains codes to match the digits in the caller identification information (CID) from the incoming call in the form NPA-NXX-XXXX to the local exchange codes (in the form NXX) for specific mobile carriers. For example, in a given area code NPA, local exchange NXX 302 may be assigned to Verizon, 301 to Sprint, etc.

In this embodiment, to ensure a correct indication of carrier, the TM 30 checks for exceptions to the NXX coding because of local number portability. A caller can change from their original mobile carrier to a different network and retain their original number, whether to another mobile carrier or to a landline telephony provider. This produces exceptions to the match of the NXX code and the carrier assigned that NXX, thus making matching less than 100% accurate. To overcome this, TM 30 may check the full phone number against an exception list (e.g., a database of Local Numbers Ported (LNPs)) to see if it has been ported from the original carrier to another local carrier. The check with the exception list is done after determination of the assigned carrier using NXX coding. Thus, the "in network" indication would not be determined on a matching NXX code alone, but in this embodiment after confirmation that the number is not in an LNP directory.

Note that the LNP exceptions are of two kinds, the first of which is LNP into the carrier, where the carrier hosts a number that does not match its assigned NXX codes. This gives a false negative on the NXX check, and the number has to be confirmed as "in network" by reference to the LNP data. Conversely, the second LNP out of the carrier yields a false positive on the NXX match on a number that has been ported to another carrier, and this number has to be confirmed as "out of network" by reference to the LNP data. The database of LNP exceptions can be stored on the TM 30 for reference and comparison, and updated over the network; or it can be stored on the carrier's network and checked via a query sent over the mobile device's data channel or via SMS messaging when one of these facilities is available without conflict of the network voice page. While both methods are technically feasible, the cost of updating the LNP database, their storage requirements, and privacy concerns would inform the actual deployment decision.

Network Determination of "in Network" Result

The determination respecting the "in-network" indication can be performed on the network before the call is terminated to the subscriber's TM 30, also known as "pre-call." This is preferably done via a query to identify the carrier associated with the CID. The query is made to a data service such as the CNAM service operated by AT&T DG, typically called a GTT query. In another embodiment, this is done by making a direct query to a carrier's subscriber database 36, e.g., the customer database at Verizon, typically called a Telephone Number Index/TNI query. These databases provide the accuracy to confirm or correct the carrier's NXX match on the CID as they are regularly updated with LNP information by the carriers. LNP changes can be queried against a database on the network, as well. When the information is obtained from these queries, it is sent to the TM 30 with other data in the call page, via SMS, or other data facility. One example of sending the query results with the call page would be to utilize the traditional CNAM facility containing the CID and display text field with name, by inserting a visible character like "*," a "0" or "1," or by using a hidden ASCII character (character invisible to the user but operable by the mobile device processor) before the text string containing the caller's name. Detection of this special character would indicate to the subscriber's TM 30 to deliver an "in-network" notification with the incoming call information. In this example, software is included so that the carrier's OEM call handler software strips the special characters (such as the "*," "0" or "1") before displaying the caller identification text, to ensure the correct display of the caller information. The system preferably would not strip hidden ASCII characters.

Delivery of the "in Network" Result Via the SMS Channel

In another embodiment, the determination respecting the "in-network" indication is performed during the incoming call via a data query on a separate SMS message channel, with the result delivered via SMS, during the incoming call, to the TM 30, known as in-call notification. In such a network deployment, a query is made by a software product on the TM 30, such as NameID™ from Cequint, Inc., which queries the database 36 to determine which carrier is associated with the number, and displays resulting caller identification information on the display of the TM 30 along with the incoming CID. The process includes making a GTT query via such client software on the TM 30, in order to confirm or correct the NXX comparison made on the CID, to provide an accurate "in-network" query result. As with the prior methods, an LPN query can be made against a database on the network or on the TM 30, for changes and correction of the in-network result. Unlike prior methods, this is not limited by the time permitted before the call is answered on the MT; an in-network notification done with this embodiment may be given after the call is answered.

Client software on the TM 30 uses a data channel to send information over the mobile carrier's data network MSC 38. An SMS message can also be used to return the in-network and LNP query results to the TM 30. In one embodiment, this is done using SMS or data channel GSM (as these networking systems permit simultaneous voice and data channel traffic to the mobile device). On CDMA networks, SMS or the data channel may be operational, but not in parallel with voice calling, which requires that the data be delivered prior to the call, or updated in the caller directory post-call, for use on subsequent calls. Typically, the result is the receipt of an 'in-network' notification during the ring sequence of an incoming call, in concert with the display of the CID by the OEM call handler software on the TM 30. It is valuable to determine the carrier associated with an MDN on the handset, when the network is unavailable due to roaming, voice call activity (CDMA networks), poor coverage, and so forth. The error rate associated with LNP is approximated at one percent in and one percent out of the networks, and although accepting such errors in all cases would not be acceptable to carriers or handset manufacturers, a 99% accuracy rate with local handset determination of the carrier associated with an MDN is sufficient for making preliminary entries in the contact database on the handset. Thus, the present invention permits preliminary entries using handset-based determination of the carrier network associated with the calling party's MDN, which is subsequently updated via network-based LNP checks. This improves the user experience of caller identification using carrier "in-network" notification by ensuring that the information is available for any phone number, and not just when the network data services are connected. Also, notably, the small percentage of LNP errors are actually opportunities for conversion of the owner of the listed MDN to the carrier network, advertising both the benefits of in-network calling and informing the use that proper network and caller identification relies on the LNP—rather than the network's own identification database; this allows a "Don't Be Lost—Join In"-themed marketing message to support the marketing campaign to switch callers to the calling party's carrier. This indicates the benefit of doing a local query on the handset to determine carrier associated with an MDN, even though more accurate information may be returned from an LNP check from a network query at a later time. These benefits result uniquely from combining both local handset query and network-based query to make in-network determinations described in the present invention.

Refreshing "in Network" Information in the Caller Directory

At times, delay in the delivery of the "in-network" notification will occur after call completion because of delay or latency in the communications networks, or caller behavior such as an immediate pickup of an incoming call by the subscriber. However, an "in-network" indication received after the incoming call is answered and/or terminated can be stored in a database or traditional caller directory on the TM 30 for later reference, known as post-call. The next time the number is received, the indication of "in-network" displays along with other information stored in the caller directory. As with other records provided by the network query, this information can be confirmed and refreshed from time to time by software on the TM 30, such as Name ID™. Preferably using a FIFO (first in first out) method, newer caller identification records (including CID, caller name, city/state or other geolocation information, and "in-network" notification) are retained and older records deleted. This forces the "in-network" indication to be analyzed anew for callers who have not called the mobile device in some time. Similarly, records can be refreshed by making queries during any incoming call; or on a periodic basis (e.g., for any caller who has not phoned the mobile device in the past 30 days).

Figure 2:
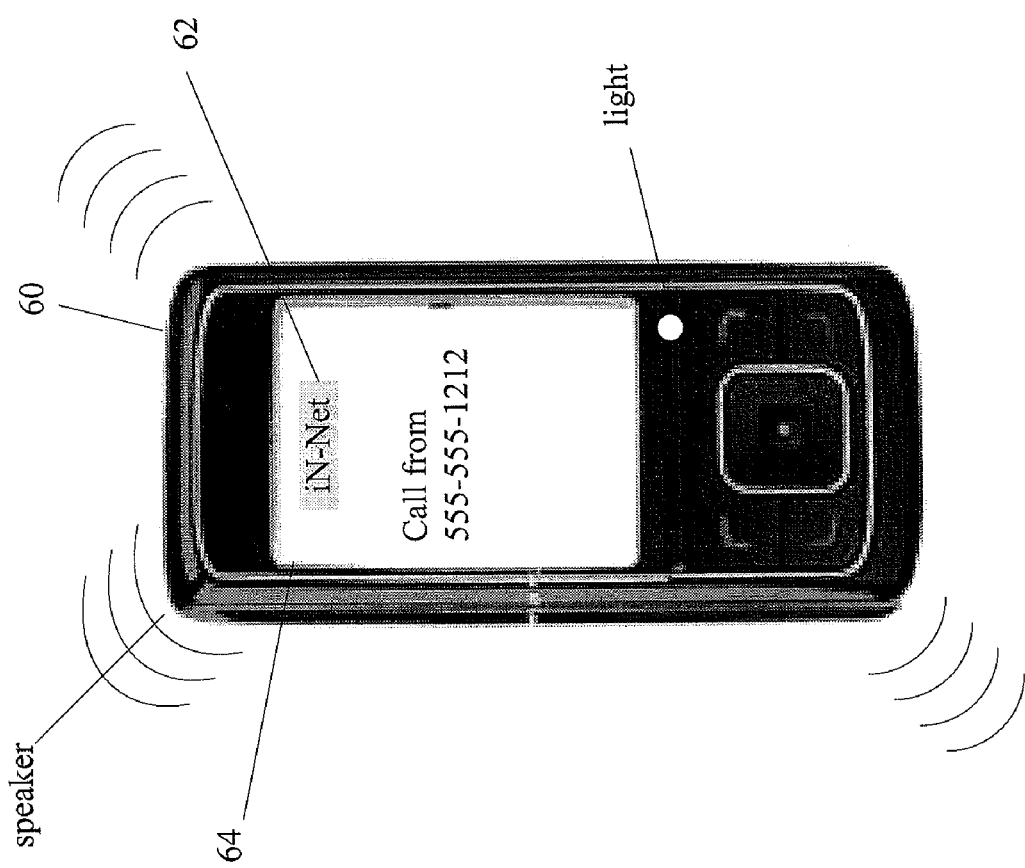
FIG. 2 is an image of a mobile device configured to alert a user of in-network and/or out-of-network calls.

FIG. 2 shows an example mobile device 60 that is receiving a call from another in-network subscriber as determined by one of the methods described above. An abbreviated "in-network" indicator 62 is displayed prominently on a display 64 of the mobile device 60.

Triggering Adoption Campaigns

This display may conclude the operation of the software, or may act as a trigger condition or input for commencement of other applications, messages and/or promotions, for the benefit of the user of the mobile device 60 or the out-of-network caller. U.S. patent application Ser. No. 12/191,904, filed Aug. 14, 2008 is hereby incorporated by reference. Specific notification or adoption messages, or software-driven campaigns, could also be triggered and targeted to an out-of-network caller, following the receipt of the initial call. SMS and out of network messages could be generated by the carrier during and/or after the incoming call to send adoption or migration messages to the caller (at no charge to the subscriber). Such messages could include, without limitation, call directory information on the called party, cost savings or comparisons associated with in-network calling, promotions for calling plans and mobile devices or device upgrades, requests to join a network, requests to join a subscriber's circle or other social call plan, instant savings or call rebates, offers for online services or software, offers of reduced cost or free phone service for adoption of other products or entering into social network groups, and the like. The offers could be presented in text only, text and graphics, or contain web links, dialog buttons, or other actionable content to solicit responses from the recipient at the OM 22.

Determining and Displaying Landline or Mobile Designation of Caller on the Mobile Handset Display In an alternative embodiment, the present invention inspects the NPA/NXX codes provided by a CID for an incoming calls to determine whether the incoming call is being made from a landline or a mobile handset. Once the determination is made, the number is preferably placed into the correct field in the mobile handset caller directory. Thereafter, the OEM software layer call handler software automatically displays the inbound number in the display, for example, using the graphic icons from the user interface in the mobile handset caller directory associated with the type of line to indicate land or mobile.

A further advantage of this embodiment is that it enables the present invention to verify, correct or replace the categorization of landline or mobile associated with the phone number in the mobile handset caller directory, for example, the mischaracterization resulting from data entry error by the user or default to the first field in the directory. In alternative embodiments, the present invention may automatically override the entry with the correction or may inform the user and request permission to make the correction to the entry.

While the preferred embodiment of the invention has been illustrated and described, as noted above, many changes can be made without departing from the spirit and scope of the invention. Accordingly, the scope of the invention is not limited by the disclosure of the preferred embodiment. Instead, the invention should be determined entirely by reference to the claims that follow.

The embodiments of the invention in which an exclusive property or privilege is claimed are defined as follows:

1. A method comprising:
    receiving a call page from a caller mobile communications network on a mobile device associated with a subscriber on a receiver mobile communications network;
    in response to receipt of the call page, sending a communication from the mobile device to a mobile switching center associated with the subscriber mobile device;
    determining at the mobile switching center if the caller mobile communications network associated with the call page matches the receiver mobile communications network associated with the subscriber mobile device based on the communication from the mobile device;
    sending the determined results to the subscriber mobile device over a data channel; and
    outputting the determined results at the subscriber mobile device.

2. The method of claim 1, wherein determining if the caller mobile communications network associated with the call page matches the receiver mobile communications network of the subscriber mobile device comprises performing a global title translation (GTT) at the mobile switching center based on the communication from the mobile device.

3. The method of claim 2, wherein sending the determined results to the subscriber mobile device comprises sending an SMS message of the determined results.

4. The method of claim 3, wherein outputting the sent results comprises outputting an indication of "in network" communication on the mobile device based on the SMS message if a match is determined.

5. The method of claim 1, wherein sending the determined results to the subscriber mobile device comprises
    sending the result of the performed GTT to the mobile device.

6. The method of claim 5, further comprising storing the received result of the performed GTT in memory of the subscriber mobile device.

7. The method of claim 1, further comprising storing the result of the determination at the subscriber mobile device.

8. The method of claim 1, wherein the outputted result comprises one or more of a visual indication, a haptic indication or an audio indication.

9. The method of claim 1, further comprising determining at the mobile switching center if the call page is being made from a landline or a mobile handset.

10. The method of claim 9, wherein determining at the mobile switching center if the call page is being made from a landline or a mobile handset comprises inspecting NPA/NXX codes provided by caller identification information.

11. The method of claim 9, further comprising:
    determining at the subscriber mobile device if the call page has been properly characterized as being from a landline or a mobile handset; and
    if the call page has not been properly characterized, correcting the characterization of the call page at the subscriber mobile device as originating from a landline or mobile handset.

12. The method of claim 11, wherein correcting the characterization of the call page as originating from a landline or mobile handset comprises overriding the original characterization at the subscriber mobile device.

13. The method of claim 11, wherein correcting the characterization of the call page as originating from a landline or mobile handset comprises notifying the subscriber the of the mischaracterization and requesting permission to correct the mischaracterization.

14. The method of claim 1, further comprising if the caller mobile communications network does not match the receiver mobile communications network associated with the subscriber, automatically generating and sending a message to a caller associated with the call page.

15. The method of claim 14, wherein the generated message comprises one or more of directory information associated with the subscriber, information associated with at least one of cost savings or comparisons associated with in-network calling, information regarding promotions for at least one of calling plans, mobile devices or device upgrades, requests to join a network, requests to join a social call plan, information regarding one of instant savings or call rebates, offers for one of online services or software, offers for one of reduced cost or free phone service in exchange for at least one of adoption of a predefined product or entering into a social network group.

16. The method of claim 15, further comprising presenting information included in the sent message.

17. The method of claim 15, wherein presenting comprises displaying at least one of text or graphics.

18. The method of claim 15, wherein presenting comprises displaying a web link.

19. A mobile device of the subscriber comprising:
    a component for receiving a call page, sending a communication to a server associated with a mobile service center (MSC) associated with the mobile device based on the received call page, and receiving results of a global title translation (GTT) performed at the server;
a processor configured to generate an output signal based on received results; and
an output device configured to output an indication of the mobile communications network of the call page based on the generated output signal.

20. The system of claim 19, wherein the output device comprises one or more of a display device, a haptic device or an audio device.

* * * * *